May 29, 1956     E. D. HUNKINS     2,747,528
GROUND PERFORATOR AND SEEDER
Filed June 21, 1952
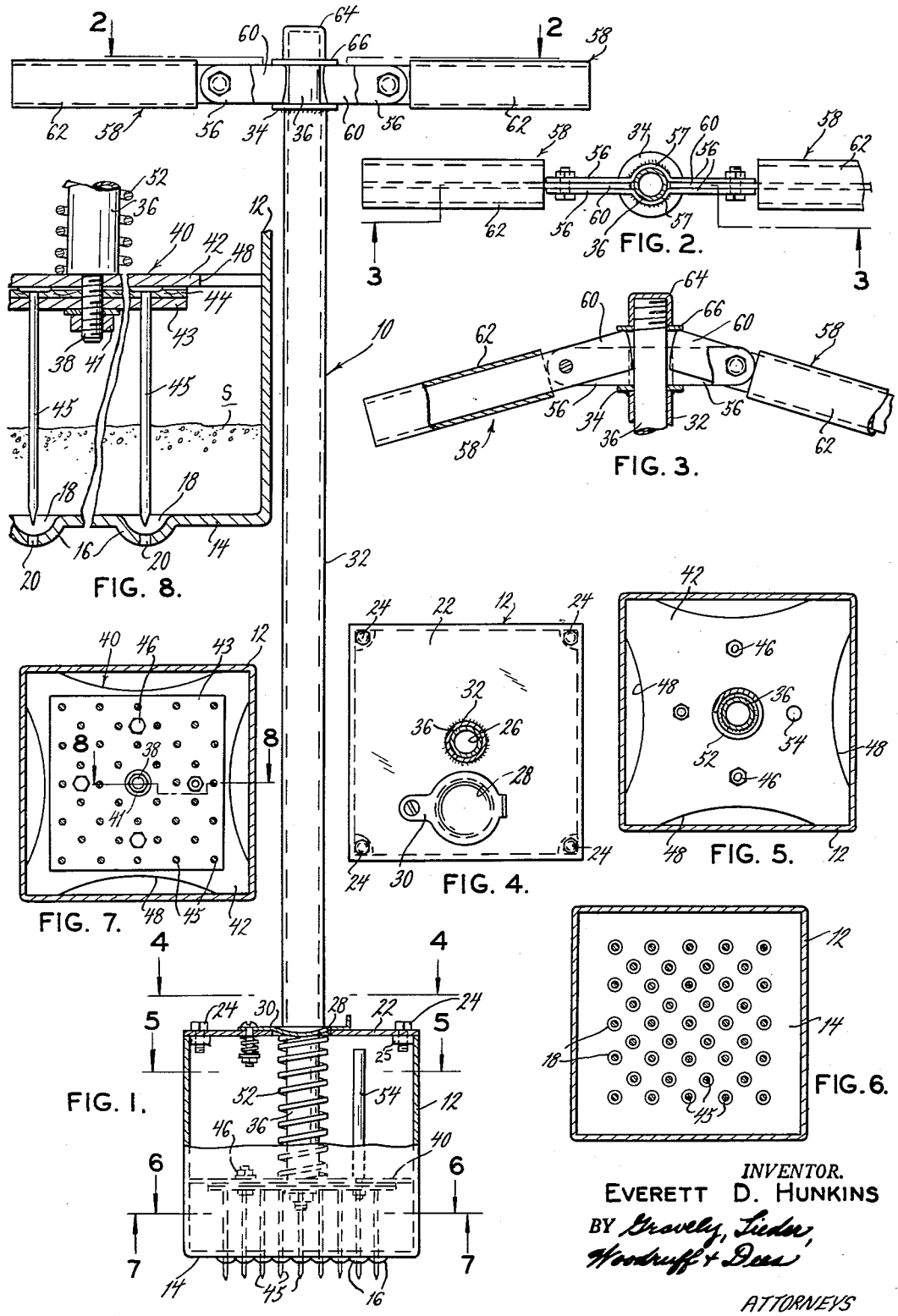
INVENTOR.
EVERETT D. HUNKINS
BY Gravely, Sieder, Woodruff & Dees
ATTORNEYS

United States Patent Office 2,747,528
Patented May 29, 1956

2,747,528

GROUND PERFORATOR AND SEEDER

Everett Demming Hunkins, University City, Mo., assignor to Garden Tools, Inc., St. Louis, Mo., a corporation of Missouri Application June 21, 1952, Serial No. 294,860

3 Claims. (Cl. 111—92)

The present invention relates generally to the seed planting art and more particularly to a novel combination ground perforator and seeder for forming indentations or perforations in the ground and depositing seeds therein.

Many of the known seeding devices in use at the present time are relatively complex in construction and require several separate and distinct operations so as to be quite cumbersome, and time-consuming in operation.

It is an object of the present invention, therefore to provide a novel ground perforator and seeder for perforating the ground and introducing the seed into the perforation in a continuous operation. More particularly, it is an object to provide such a device which includes a handle for placing the device in position and for aiding in the forming of the perforations in the ground, and which, when actuated, causes the seeds to be deposited in the previously formed perforations. Specifically, it is an object to provide a device of this type which includes a plurality of exposed depending prongs for forming indentations in the surface of the ground, and handle means for simultaneously withdrawing the prongs from the ground and depositing seeds in the previously formed perforations or indentations.

Another object is to provide a novel ground perforator and seeder in which the ground-perforating prongs can be easily and quickly replaced when they become worn or damaged.

Another object is to provide a novel ground perforator and seeder which includes means for guiding the seeds and the tips of the ground-perforating prongs into the openings contained in the bottom of the container. More particularly, it is an object to provide such a device which includes cup-like depressions around the opening contained in the bottom wall of the container so as to guide the seeds and the tips of the prongs therethrough.

Another object is to provide a novel ground perforator and seeder which is of simple and rugged construction, and which can be used to quickly and effectively sow seeds over a large area.

Another object is to provide a device of this type which can also be used for perforating the ground and depositing either fertilizer alone, or a mixture of fertilizer and seeds, in the perforations.

Further objects and advantages of the present invention will be apparent from the following detailed description, reference being had to the accompanying drawing wherein a preferred embodiment of the present invention is shown.

Briefly, the invention comprises a seed container including a bottom wall having spaced openings therein; a prong assembly having a plurality of depending prongs positioned to extend through the opening in the bottom wall; means mounting the prong assembly for reciprocating movement relative to the bottom wall of the container between an extended position in which the tips of the prongs extend through the openings, and a retracted position in which the tips of the prongs are withdrawn inside the container; yieldable means urging the prong assembly toward the extended position; and manually operable means for moving the prong assembly to the retracted position.

The prongs are preferably removable so that damaged and worn prongs can be easily and quickly replaced. Also, it is preferred that cup-like depressions be formed about the openings in the bottom wall of the container, to guide the seeds and the tips of the prongs into and through the openings.

In the drawings:

Fig. 1 is a side elevational view of a combination ground perforator and seeder constructed in accordance with the teachings of the present invention, with the handle members in the extended or inoperative position, portions of the device being shown in cross section to better illustrate the construction, Fig. 2 is a fragmentary horizontal sectional view of the top of the device taken on the line 2—2 in Fig. 1, Fig. 3 is a fragmentary vertical-sectional view taken on the line 3—3 in Fig. 2 but with the handle members in the operative position to retract the prongs, Figs. 4, 5, 6 and 7 are horizontal-sectional views taken on the lines 4—4, 5—5, 6—6, and 7—7, respectively, in Fig. 1, and Fig. 8 is an enlarged fragmentary vertical sectional view taken on the line 8—8 in Fig. 7, with the prongs shown in the retracted or withdrawn position.

Referring to the drawing more particularly by reference numerals, 10 indicates generally a combination ground perforator and seeder embodying the teachings of the present invention. The device 10 includes a container 12 for seeds S, which is open at the top and which has a bottom wall 14. The bottom wall 14 includes a plurality of geometrically-spaced, hemispherical-shaped, protuberances 16, each of which provide a small cavity 18 (Fig. 8). Openings 20 are provided in the bottoms of the protuberances 16 for a purpose to appear.

A cover 22 is removably fastened to the open upper end of the container 12 by bolts 24 which are threaded into lugs 25 welded to the inner surfaces of the container. The cover 22 has a circular opening 26 at its center and another circular opening 28 offset therefrom so as to provide a means for introducing the seeds S into the container 12.

A pivotally mounted closure member 30 is associated with the opening 28 for selectively closing it to prevent the seeds S from falling out of the container 12.

Fastened to the cover 22 in axial alignment with the central opening 26, is an upwardly-extending tubular housing 32 which has a flange 34 (Fig. 3) provided at the upper end thereof.

A hollow shaft 36 is slidably disposed in the housing 32 so as to extend upwardly through the opening 26 into the container 12, and has a threaded stud-like portion 38 depending from the lower end thereof (Fig. 8).

Mounted on the stud-like portion 38 is a prong assembly 40 which is removably maintained in position by a nut 41, and which includes upper and lower plate-like members 42 and 43, respectively, which have a gasket 44 therebetween. The gasket 44 and the lower plate-like member 43 include spaced openings to receive a plurality of headed prongs 45, the lower ends of which are pointed and are in substantial alignment with the openings 20 contained in the bottom wall 14. The prongs 45 are of substantially the same diameter as the openings 20 so as to prevent the seeds S from passing through the openings 20 when the prongs 45 extend therebetween.

Nut and bolt assemblies 46 hold the upper and lower plate-like members 42 and 43 in close spaced relationship so as to securely clamp the headed portions of the prongs 45 between them.

The gasket 44 is preferably made of a resilient material so as to provide a very slight movement of the lower ends of the prongs 45 to compensate for any slight deviation from alignment of the prongs 45 with the openings 20.

The upper plate-like member 42 has arcuate side edges 48 spaced from the side walls of the container 12 to permit the seeds S to pass downwardly from the opening 28 to the vicinity of the cavities 18.

A coiled spring 52 is disposed about the lower end of the shaft 36 between the cover 22 and the upper plate-like member 42 so as to urge the prong assembly 40 downwardly relative to the cover 22.

Extending upwardly from the upper plate-like member 42 is a stop rod 54 (Fig. 1) which is adapted to contact the underside of the cover 22 when the prong assembly 40 is moved upwardly relative to the bottom wall 14, so as to limit the distance the lower ends of the prongs 50 can be retracted through the openings 20.

The means for moving the prong assembly 40 so as to retract the prongs 45 will now be described.

As previously mentioned, a flange 34 is provided at the upper end of the tubular housing 32 (Fig. 3). Fastened to this flange 34, as by welding, are two transversely extending strap-like brackets 56 which are spaced a short distance apart and which have arcuate center portions 57 for slidably receiving the upper end of the hollow shaft 36.

Pivotally mounted between the brackets 56 at the outer ends thereof are opposed handle members 58, each of which includes a blade portion 60 and a handle portion 62.

A cap 64 is mounted on the upper end of the hollow shaft 36 and contains a flange portion 66 which is adapted to contact the upper edges of the brackets 56 so as to limit the downward movement of the shaft 36 and the prong assembly 40.

The inner ends of the blade portions 60 extend under the flange 66 of the cap 64 so that the cap 64 and the shaft 46 are moved upwardly when the handle members 58 are pivoted downwardly, as will be more fully described.

*Operation*

In the extended position as shown in Fig. 1, the pointed ends of the prongs 45 extend through the openings 20 a distance which is determined by the length of the shaft 36, because, as previously described, the downward movement of the shaft 36 is limited by the flange 66 of the cap 64 contacting the upper edges of the brackets 56.

The spring 52 between the cover 22 and the prong assembly 40, yieldably maintains the prongs 50 in the extended or exposed position.

The seeds S, which are poured into the container 12 through the openings 28, flow downwardly between the arcuate side edges 48 of the upper plate-like member 42 and into the cavities 18 about the openings 20.

To perforate the ground using the present device, it is grasped by the handle portions 62 and thrust downwardly in a substantially vertical direction so as to drive the pointed ends of the prongs 50 into the ground. Or, if the operator so desires, the lower ends of the prongs 50 can be placed in contact with the ground, and the cover 22 stepped upon by the operator so as to force the ends of the prongs 50 into the ground, to form a series of spaced indentations.

The relatively strong spring 52 prevents the prongs 45 from being forced upwardly as they are inserted into the ground except when they encounter rocks or the like, and the spring 52 then acts as a safety device to prevent the prongs 45 from being damaged.

After the prongs 45 have been inserted into the ground, the outer ends of the handles 58 are pivoted downwardly so as to cause the inner end of the blade portions 60 to pivot upwardly in contact with the underside of the flange portion 66 of the cap 64 (Fig. 3).

This forces the cap 64 and the hollow shaft 36 upwardly relative to the housing 32 and the container 12, so as to retract the prongs 50 into the container 12 (Fig. 8) and compress the spring 52.

The stop rod 54 (Fig. 1) is of a predetermined length so that when the upper end of it contacts the underside of the cover 22, the tips of the prongs 45 have been withdrawn into the container 12 a sufficient distance to uncover the openings 20 and to permit seeds S to pass through the openings 20 and into the indentations previously formed in the ground.

When the handles 58 are released, they are returned to the normal position shown in Fig. 1 by the force of the spring 52 urging the prong assembly 40 downwardly relative to the container 12. This tends to tamp the seeds into the indentations formed in the ground, and at the same time, tends to lift the device 10 upwardly relative to the ground.

Worn and damaged prongs 45 can be quickly and easily replaced by first removing the bolts 24 removing the container 12 from the bottom of the device, then removing the nut 41, and stripping the lower plate-like member 43, the gasket 44, and the prongs 45, from off the end of the stud-like portion 38. The damaged or worn prongs 45 can then be quickly and easily replaced and the prong assembly 41 reassembled on the stud-like portion 38.

Thus it is apparent that there has been provided a novel ground perforator and seeder which fulfils all of the objects and advantages sought therefor. Indentations can be made in the ground and seeds deposited therein by a continuous operation so that a relatively large area can be quickly and easily seeded in a relatively short period of time. The depressions or protuberances 16 in the bottom wall 14 of the container guide the lower ends of the prongs 45 into the openings 20 if they are not in exact alignment therewith, and also aid in guiding the seeds into the openings 20. Also, worn or damaged prongs 45 can be easily and quickly replaced using conventional tools. Furthermore, the device is of simple and rugged construction so that it is relatively inexpensive to manufacture and requires a minimum amount of maintenance.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A ground perforator and seeder, comprising a container for seeds having a bottom wall provided with a plurality of spaced openings therein; a cover for said container; a tubular housing supported on the cover and extending upwardly therefrom; a shaft mounted for reciprocal movement in the tubular housing and having an upper end extending upwardly above the upper end of said housing; said shaft also having a lower end extending into said container; a prong assembly mounted on the lower end of the shaft within the container, the prong assembly including depending prongs in substantial alignment with the openings in the bottom wall of the container; a bracket fastened to the tubular housing adjacent its upper end so as to extend transversely thereof; a flange on the upper end of the shaft for contacting the bracket so as to limit the downward movement of the shaft relative to the housing; and opposed handle members pivotally mounted adjacent the outer ends of the bracket inwardly of the outer ends of the handle members, the inner ends of the handle members being disposed below and for engagement with the flange on the shaft whereby when the outer ends of the handle members are pivoted downwardly, the shaft and the prong assembly are moved upwardly relative to the bottom wall of the container.

2. In a ground perforator and seeder including a container for seeds having a perforated bottom wall, and a prong assembly movable in said container and having depending prongs extending through said perforated bottom wall in ground perforating position, said prongs being retractable into said container in seed releasing position; means for controlling the movement of said prong assembly in said container to move said prongs between ground perforating and seed releasing positions, said means comprising a tubular member having one end secured to said container, opposed handle members pivoted to the other end of said tubular member and having free inner and outer ends, a shaft slidable relative to said tubular member and carrying said prong assembly on one of its ends, the other end of said shaft extending beyond the other end of said tubular member and carrying an abutment in contact with said inner ends of said handle members whereby movement of the outer ends of said handle members effects relative movement between said shaft and tubular member and between said prong assembly and container.

3. A combination ground perforator and seeder, comprising a container for seeds having a bottom wall adapted for surface abutment with ground to be perforated, said bottom wall having a plurality of spaced openings therein; a tubular housing secured to said container and extending upwardly therefrom, a shaft slidably positioned in said tubular housing and having upper and lower end portions extending beyond the ends of said tubular housing, the upper end of said shaft having abutment means secured thereto; opposed handle members pivotally mounted on the upper end of said tubular housing, each of said handle members having free inner ends adapted to move upwardly into contact with said abutment means on said shaft in response to downward movement of the outer ends of said handles to effect upward movement of said shaft relative to said tubular member; a prong assembly mounted on the lower end of said shaft within said container, the prong assembly including depending prongs in alignment with the openings in said bottom wall; yieldable means biasing said prong assembly and shaft downwardly relative to said container and tubular housing whereby said prongs extend through said openings outwardly and below said bottom wall in ground perforating position, said handles being adapted to move said shaft upwardly against the biasing action of said yieldable means for moving said prongs inwardly and above said bottom wall in seed releasing position.

References Cited in the file of this patent

UNITED STATES PATENTS

| | | |
|---|---|---|
| 25,595 | Wasterbarg | Sept. 27, 1859 |
| 1,258,551 | Fleming | Mar. 5, 1918 |
| 1,624,033 | Barnard | Apr. 12, 1927 |
| 1,909,613 | Conner | May 16, 1933 |
| 1,965,177 | Finkl | July 3, 1934 |
| 2,079,506 | Jenks | May 4, 1937 |

FOREIGN PATENTS

| | | |
|---|---|---|
| 915,543 | France | July 22, 1946 |
| 38,274 | Germany | Jan. 24, 1887 |
| 330,688 | Germany | Dec. 20, 1920 |
| 3,869 | Great Britain | 1878 |
| 4,958 | Switzerland | Mar. 2, 1892 |